US011756018B2

(12) United States Patent
Cheek et al.

(10) Patent No.: US 11,756,018 B2
(45) Date of Patent: *Sep. 12, 2023

(54) DATA PROCESSING APPARATUS WITH A LOGIC PROCESSING DEVICE FOR PROCESSING NETWORK DATA RECORDS TRANSMITTED FROM A PLURALITY OF REMOTE, DISTRIBUTED TERMINAL DEVICES

(71) Applicant: Tab Solutions, LLC, Fishkill, NY (US)

(72) Inventors: Paul Raynor Cheek, Wellesley, MA (US); Robert Philip Ianelli, Hopewell Junction, NY (US)

(73) Assignee: Tab Solultions LLC, Fishkill, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/240,203

(22) Filed: Apr. 26, 2021

(65) Prior Publication Data
US 2022/0084007 A1    Mar. 17, 2022

Related U.S. Application Data

(63) Continuation of application No. 15/904,516, filed on Feb. 26, 2018, now Pat. No. 11,004,055, which is a continuation of application No. 14/035,548, filed on Sep. 24, 2013, now abandoned.

(60) Provisional application No. 61/826,130, filed on May 22, 2013.

(51) Int. Cl.
*G06Q 20/22* (2012.01)
(52) U.S. Cl.
CPC .................. *G06Q 20/29* (2013.01)

(58) Field of Classification Search
None
See application file for complete search history.

(56) References Cited

U.S. PATENT DOCUMENTS

| | | |
|---|---|---|
| D318,067 S | 7/1991 | McCormick |
| D387,802 S | 12/1997 | Finkelstein |
| 5,876,067 A | 3/1999 | Kaplan |
| D453,337 S | 2/2002 | Pentz et al. |
| D453,338 S | 2/2002 | Pentz et al. |
| D462,966 S | 9/2002 | Pentz et al. |
| D511,543 S | 11/2005 | Lubking |
| D518,058 S | 3/2006 | Hart et al. |
| D524,858 S | 7/2006 | Graves et al. |
| D535,691 S | 1/2007 | Robertson |
| D553,675 S | 10/2007 | Hogg |
| D553,676 S | 10/2007 | Hogg |

(Continued)

FOREIGN PATENT DOCUMENTS

WO    WO 2008/089127    7/2008

*Primary Examiner* — Christopher Bridges
(74) *Attorney, Agent, or Firm* — LSIP Law LLC

(57) ABSTRACT

A data processing apparatus for processing network data transmitted from a plurality of remote, distributed terminal devices, comprising: a logic processing device that: accesses, over one or more distributed networks, instructions that define initialization of a process of determining multi-user network sources and that specify to allocate one or more portions of a virtual record among the multi-user network sources by automatically simulating a digital exchange process in which the data processing apparatus is a receiving source to receive at least one of the one or more portions by a processing network.

20 Claims, 11 Drawing Sheets

(56) References Cited

U.S. PATENT DOCUMENTS

| | | |
|---|---|---|
| D560,715 S | 1/2008 | Hogg |
| D615,585 S | 5/2010 | Skinner et al. |
| D616,021 S | 5/2010 | Halbur |
| 8,145,561 B1 | 3/2012 | Zhu |
| 8,285,587 B2 | 10/2012 | Saguy |
| 8,328,095 B2 | 12/2012 | Oder, II et al. |
| 8,374,575 B2 | 2/2013 | Mullen |
| 8,444,053 B2 | 5/2013 | Harris |
| 8,459,548 B2 | 6/2013 | Mullen et al. |
| 8,469,265 B2 | 6/2013 | Pletz et al. |
| 8,485,437 B2 | 7/2013 | Mullen et al. |
| 8,493,442 B2 | 7/2013 | Fernandez et al. |
| 8,494,913 B2 | 7/2013 | Cavagnaro |
| 8,494,959 B2 | 7/2013 | Hathaway et al. |
| 8,515,868 B2 | 8/2013 | Hirka et al. |
| 8,523,059 B1 | 9/2013 | Mullen et al. |
| 8,533,116 B2 | 9/2013 | Davis et al. |
| 8,538,458 B2 | 9/2013 | Haney |
| 8,543,157 B1 | 9/2013 | Fujisaki |
| 8,554,675 B2 | 10/2013 | Gupta et al. |
| 8,571,995 B2 | 10/2013 | Spies et al. |
| D721,399 S | 1/2015 | Senese |
| 9,710,801 B2 * | 7/2017 | Aadi .................. G06Q 20/29 |
| 9,875,469 B1 * | 1/2018 | Chin ............... G06Q 20/3276 |
| 9,978,052 B2 * | 5/2018 | Zhao ................ G06Q 20/384 |
| 11,195,156 B2 * | 12/2021 | Ham ................ G06Q 20/102 |
| 2004/0078325 A1 | 4/2004 | O'Connor |
| 2010/0010906 A1 | 1/2010 | Grecia |
| 2010/0082481 A1 * | 4/2010 | Lin .................. G06Q 20/3278 |
| | | 705/41 |
| 2010/0191629 A1 | 7/2010 | Olliphant |
| 2012/0150728 A1 * | 6/2012 | Isaacson ........... G06Q 30/0226 |
| | | 705/39 |
| 2012/0173396 A1 | 7/2012 | Melby et al. |
| 2013/0041824 A1 * | 2/2013 | Gupta .................. G06Q 40/00 |
| | | 705/44 |
| 2013/0317893 A1 * | 11/2013 | Nelson ................ G06Q 10/02 |
| | | 705/40 |
| 2014/0100931 A1 * | 4/2014 | Sanchez ............... H04L 63/083 |
| | | 705/40 |
| 2014/0164234 A1 | 6/2014 | Coffman et al. |
| 2014/0250009 A1 | 9/2014 | Carlson |
| 2014/0279098 A1 | 9/2014 | Ham |
| 2014/0351118 A1 | 11/2014 | Zhao |

* cited by examiner

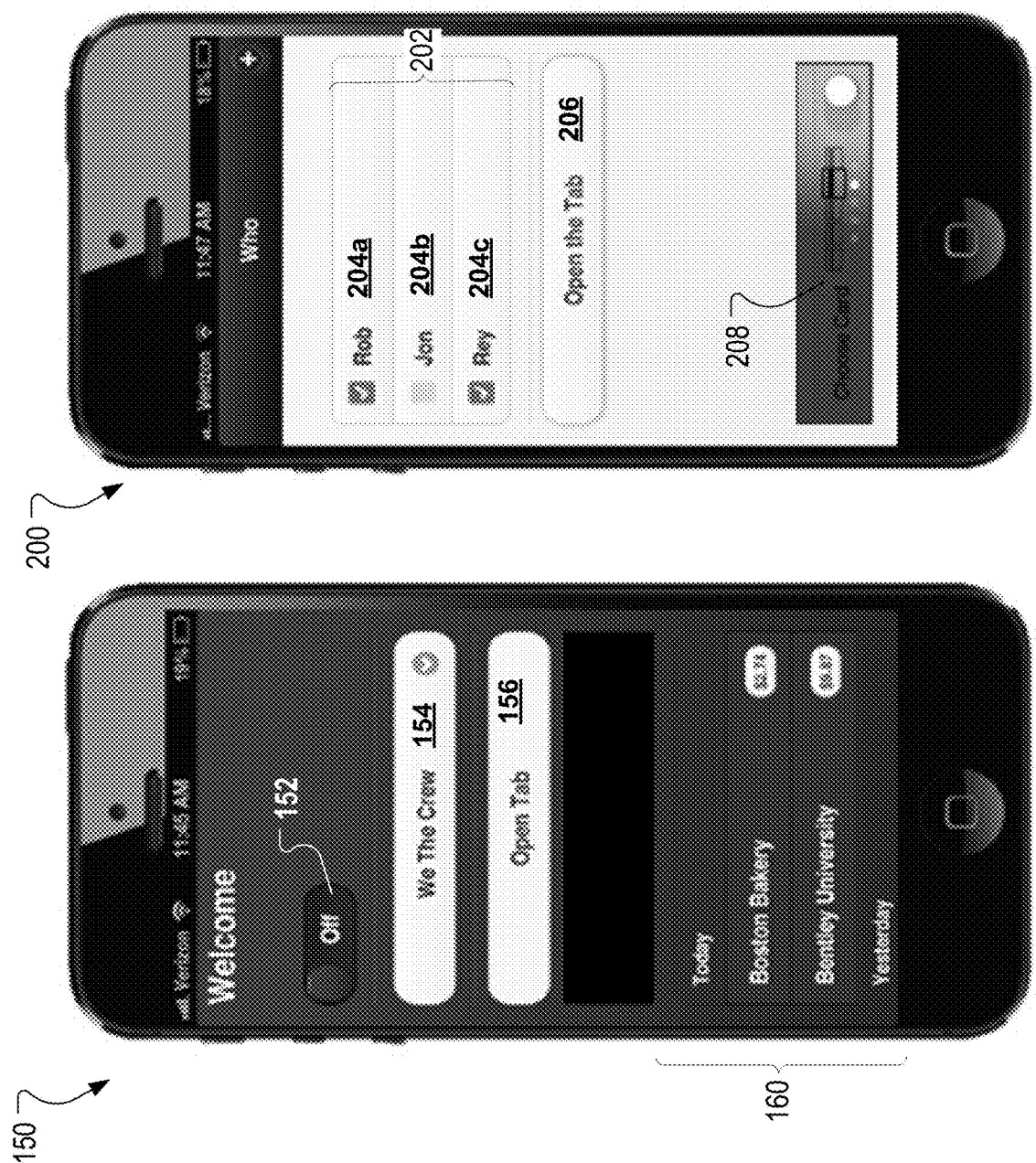

DATA PROCESSING APPARATUS WITH A LOGIC PROCESSING DEVICE FOR PROCESSING NETWORK DATA RECORDS TRANSMITTED FROM A PLURALITY OF REMOTE, DISTRIBUTED TERMINAL DEVICES

CLAIM OF PRIORITY

This application is a continuation of U.S. patent application Ser. No. 15/904,516, filed on Feb. 26, 2018, which is a continuation of U.S. patent application Ser. No. 14/035,548, filed on Sep. 24, 2013, which claims benefit of U.S. Provisional Patent Application No. 61/826,130, filed May 22, 2013, the contents of each of which are incorporated by reference in their entirety.

TECHNICAL FIELD

The techniques described herein generally pertain to a data processing apparatus with a logic processing device for processing network data records transmitted from a plurality of remote, distributed terminal devices.

BACKGROUND

A credit card and/or a debit card is a payment card issued to users as a system of payment.

SUMMARY

In one aspect of the present disclosure, a data processing apparatus for processing network data records transmitted from a plurality of remote, distributed terminal devices, comprising: a logic processing device that: accesses, over one or more distributed networks, instructions that define initialization of a process of determining multi-user network sources and that specify to allocate one or more portions of a virtual record among the multi-user network sources by automatically simulating a digital exchange process in which the data processing apparatus is a receiving source to receive at least one of the one or more portions by a processing network; obtains, from an issuer system that issued a physical machine-readable device to a first user over the one or more distributed networks, digital data from the plurality of remote, distributed terminal devices that are each different from each other, with an item of the obtained digital data being indicative of a request to approve a digital exchange process initiated with the physical machine-readable device, with the item of obtained digital data comprising identifying data of the first user who initiated the digital exchange process, a unique identifier of the physical machine-readable device and a field value specifying an amount of the digital exchange process, and with the first user having a first data record stored on a data repository of one or more computer systems; wherein the item of obtained digital data is obtained in response to a system of the processing network detecting that a physical machine-readable device represented by the unique identifier is a specified type of physical machine-readable device to correlate a digital exchange process with the multi-user network sources; a correlation engine that determines a match between (i) the unique identifier included in the item of digital data received from the processing network, and (ii) a unique identifier associated with the first data record of the first user; based on the match between the unique identifiers and based on execution of the obtained instructions, identifies a virtual record for the digital exchange process that is associated with the first data record of the first user, wherein the virtual record comprises an electronic mechanism that implements multi-user network sources to source a particular digital exchange process; automatically correlates (i) the field value received from the processing network, with (ii) the virtual record, with the field value being correlated with the virtual record independent of user input of the amount of the digital exchange process; an executable logic engine that receives, from a client device of the first user, allocation information requesting that the field value correlated with the virtual record be allocated between at least the first user and a second user, with the data processing apparatus differing from each of the client device and a point of sale device processing the digital exchange process; following receipt of the allocation information: determines, based on the identifying information of the first user and the allocation information, that portions of the field value are to be assigned to at least a first one of the multi-user network sources associated with the first data record of the first user and a second one of the multi-user network sources associated with a second data record of the second user; determines, based on the amount of the digital exchange process specified by the item of digital data obtained over the one or more distributed networks, a portion of the field value with which one or more fields in the second data record are modified; based on executing the obtained instructions, automatically simulating, a digital exchange process in which one or more fields in one or more data records stored in the data processing apparatus are modified to include the determined portion of the field value, wherein approval for each user record for the digital exchange process is received during the simulation; and a transmission engine that correlates the first data record with the second user allocation amount specified by the item of digital data obtained over the one or more distributed networks and that includes computer code for using the second user allocation amount with which the first data record is correlated to enhance the first data record by: automatically causing, based on the simulating and in response to receiving the approval, the first data record to be modified with an entry specifying a transmission of the determined portion of the field value from the second data record to the first data record and the second data record to be modified with an entry representing the transmission to the first data record of the determined portion of the field value amount independent of input from the second user specifying the determined portion of the field value, wherein the modification of the first and second data records occur substantially simultaneously.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more embodiments of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 1B, 2-6 and 9 are screen images of graphical user interfaces that are rendered with information generated by a system for determining multi-user funding sources.

DETAILED DESCRIPTION

A system consistent with this disclosure allocates (e.g., automatically, evenly and/or based on pre-determined amounts) the cost of a transaction among a plurality of users of the system. In an example, the system promotes crowd spending. Generally, crowd spending includes the splitting and sharing of a cost (e.g., for a good or a service) among two or more people.

Figure 1A:
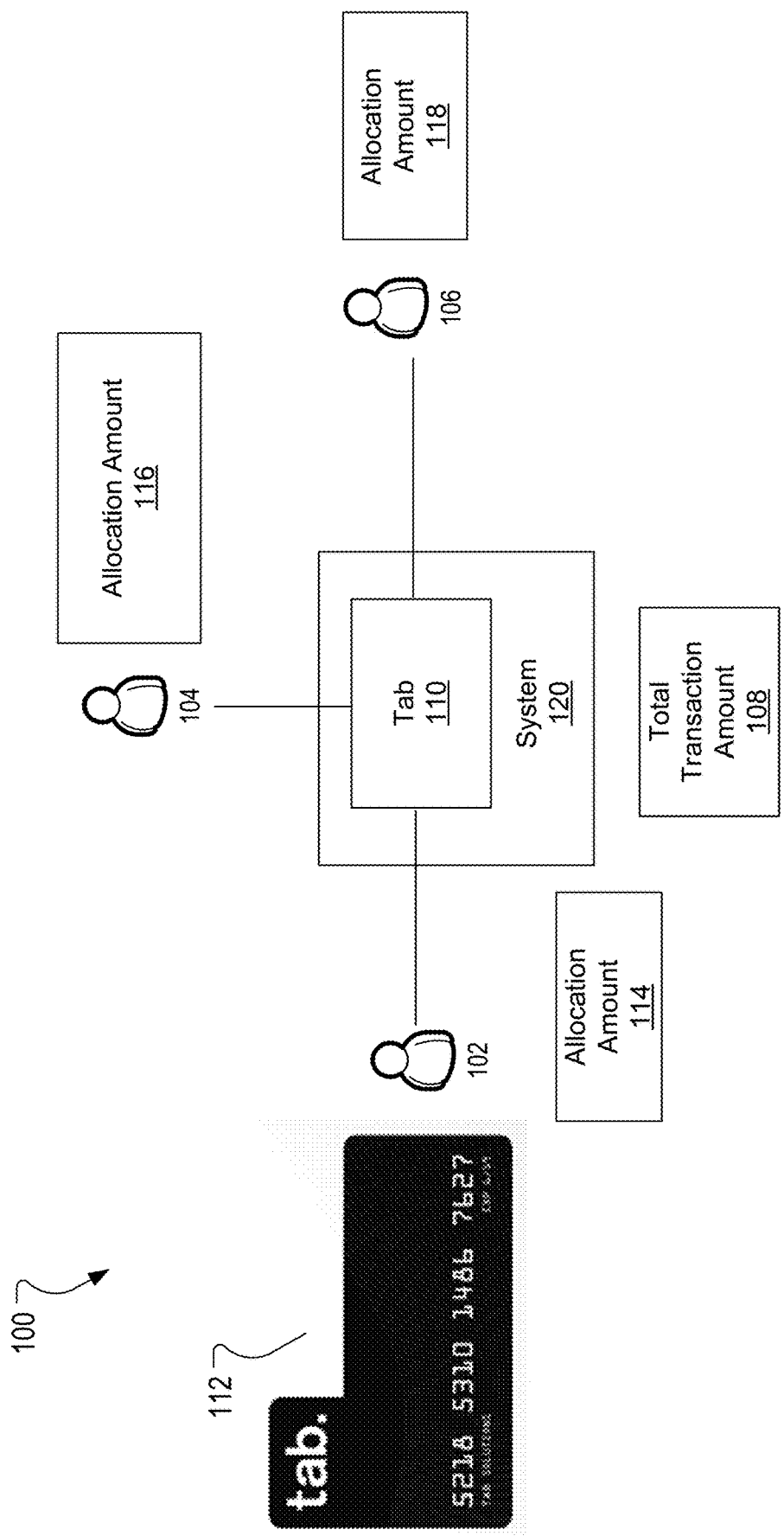
FIG. 1A is an example of a conceptual environment for implementation of a virtual tab.

Referring to FIG. 1A, a conceptual environment 100 for implementation of a virtual tab is shown. Generally, a virtual tab (hereinafter "tab") includes a payment mechanism that implements multi-user funding sources to pay for a particular transaction. Generally, multi-user funding sources enable a cost of a transaction to be allocated over a plurality of users. Conceptual environment 100 includes users 102, 104, 106 and system 120. In this example, system 120 includes a system for generating and opening a tab, including, e.g., tab 110.

In the example of FIG. 1A, users 102, 104, 106 participate in a transaction together, e.g., eat a meal together at a restaurant. In this example, the transaction is associated with a total transaction amount 108 (e.g., the cost of the bill at the restaurant). In this example, user 102 has a payment card 112, which enables user 102 to pay for the transaction. In this example, user 102 has a user account with system 120. In this example, upon issuance of payment card 112 to user 102, user 102 enrolls payment card 112 in system 120, e.g., to enable using payment card 112 to pay tabs. In this example, payment card 112 is associated with activation and deactivation features, e.g., to enable activation and deactivation of payment card 112 and/or an account associated with payment card 112. Payment card 112 may also be re-activated and/or associated with a personal identification number (PIN) that may be entered prior to use of payment card 112. In an example, user 102 can enable or disable PIN-less purchases on payment card 112, e.g., purchases that are made via payment card 112 without entering the PIN.

Payment card 112 is associated with the user account for user 102, e.g., to link payment card 112 to user 102 in system 120. For example, the user account includes the card number for payment card 112. System 120 also enables user 102 to open tab 110 for the transaction. In this example, tab 110 is also associated with the user account for user 102. For example, tab 110 is associated with a string of uniquely identifying numbers and system 120 updates the user account for user 102 with the string of uniquely identifying numbers. Subsequent to opening tab 110, user 102 invites users 104, 106 to join tab 110, e.g., to promote allocating (e.g., evenly) total transaction amount 108 among users 102, 104, 106. As described in further detail below, users 104, 106 accept the invitation and join tab 110.

In this example, payment card 112 includes a credit card, a debit card, and so forth. As previously described, payment card 112 is associated with the account of user 102 on system 120. In this example, user 102 pays the total transaction amount 108 on payment card 112 (e.g., by allowing the restaurant to charge payment card 112 for the total transaction amount 108). As described in further detail below, following charging of payment card 112 for the total transaction amount 108, system 120 receives a message notifying system 120 of the charge and the total transaction amount 108 of the charge. The received message includes the card number for payment card 112. Using the card number for payment card 112, system 120 determines that payment card 112 is associated with tab 110 of user 102. In this example, tab 110 represents a request to allocate (e.g., evenly) total transaction amount 108 among users who choose to participate in the tab 110 (e.g., users 102, 104, 106). In this example, system 120 allocates the total transaction amount 108 among users 102, 104, 106, e.g., by charging allocation amounts 114, 116, 118 to accounts associated with users 102, 104, 106, respectively. The associated accounts (that are charged for the allocation amounts) include payment cards that system 120 has on file, PayPal accounts, stored value accounts, bank accounts and so forth.

In this example, system 120 automatically and evenly allocates the total transaction amount 108 among users 102, 104, 106, e.g., independent of user 102 specifying an amount to be allocated to each of the other users. That is, system 120 automatically determines allocation amounts 114, 116, 118, independent of user input other than setting up tab 110.

Referring to FIG. 1B, graphical user interface 150 is for opening a tab, e.g., for user 102 (FIG. 1A) opening tab 110 on system 120. In this example, information for graphical user interface 150 is generated by system 120 and graphical user interface 150 is displayed on a client device of user 102. Graphical user interface 150 includes control 152 for turning a tab on and off. By turning a tab on, a user instructs the system to start a process of determining multi-user funding sources (e.g., credit cards of various users) to pay for a transaction. By turning a tab off, a user instructs the system to cease the process of determining multi-user funding sources to pay for a transaction.

Graphical user interface 150 includes funding user control 154, selection of which enables a viewer of graphical user interface 150 to select one or more other users (e.g., users 104, 106 in FIG. 1A) to fund a transaction. Through funding user control 154, a user may select one or more pre-defined groups of other users (e.g., friends). Generally, friends refer to users with a social connection to another user in a social networking graphical of a social networking platform. By enabling a user to select friends to join a tab, the system promotes security and prevents against fraud. For example, if friends of a user are joining a tab, it is less likely that the user opening a tab is using an account fraudulently. The user may specify these groups through the system, e.g., by generating different groups and by specifying which other users to include in which groups. Graphical user interface 150 also includes open tab control 156, selection of which enables a user to start a new tab. Graphical user interface 150 also includes portion 160 for displaying other tabs that are associated with the user and associated transaction amounts of the other tabs.

Referring to FIG. 2, graphical user interface 200 enables selection of one or more users (e.g., users 104, 106 in FIG. 1A) who are invited to fund a particular transaction and participate in a tab. In this example, graphical user interface 200 is displayed following selection of funding user control 154 (FIG. 1B). Graphical user interface 200 includes portion 202, e.g., for display of names of the users that are included in the group specified by funding user control 154. In another example, graphical user interface 200 may include names of users, e.g., independent of the users being associated with a particular group.

Portion 202 includes selection controls 204a, 204b, 204c, e.g., for selection of one or more users to be added to a tab. Graphical user interface 200 also includes open tab control 206, selection of which enables a user to start the tab, e.g., by inviting users to join the tab. Graphical user interface 200 includes card selection control 208, e.g., to enable the viewer of graphical user interface 200 to select a particular payment card to use to pay for the viewer's portion of the tab. There are various types of payment cards, including, e.g., a debit card and a credit card. As described in more detail below, the system provides a user with an account. The user can input, into the system, information indicative of one or more payment cards and/or bank accounts. The system associates the input information with the user's account, e.g., to enable the user to use one of the payment cards as a funding source for the user's portion of the transaction.

In a variation of FIG. 2, during an invite, a user can take a photograph and/or a video of the item (e.g., a physical product, a gift, a tangible good, and so forth) being purchased and send the photograph (and/or the video) to the invitees. In an example, the photograph can have a caption included for the recipient to read and review along with the photograph. In still another variation of FIG. 2, the users invited to join a tab may enter credit card information into a mobile device of the cardholder of a funding source payment card 801 (e.g., a user who is inviting the other users to join a tab).

Figure 3:
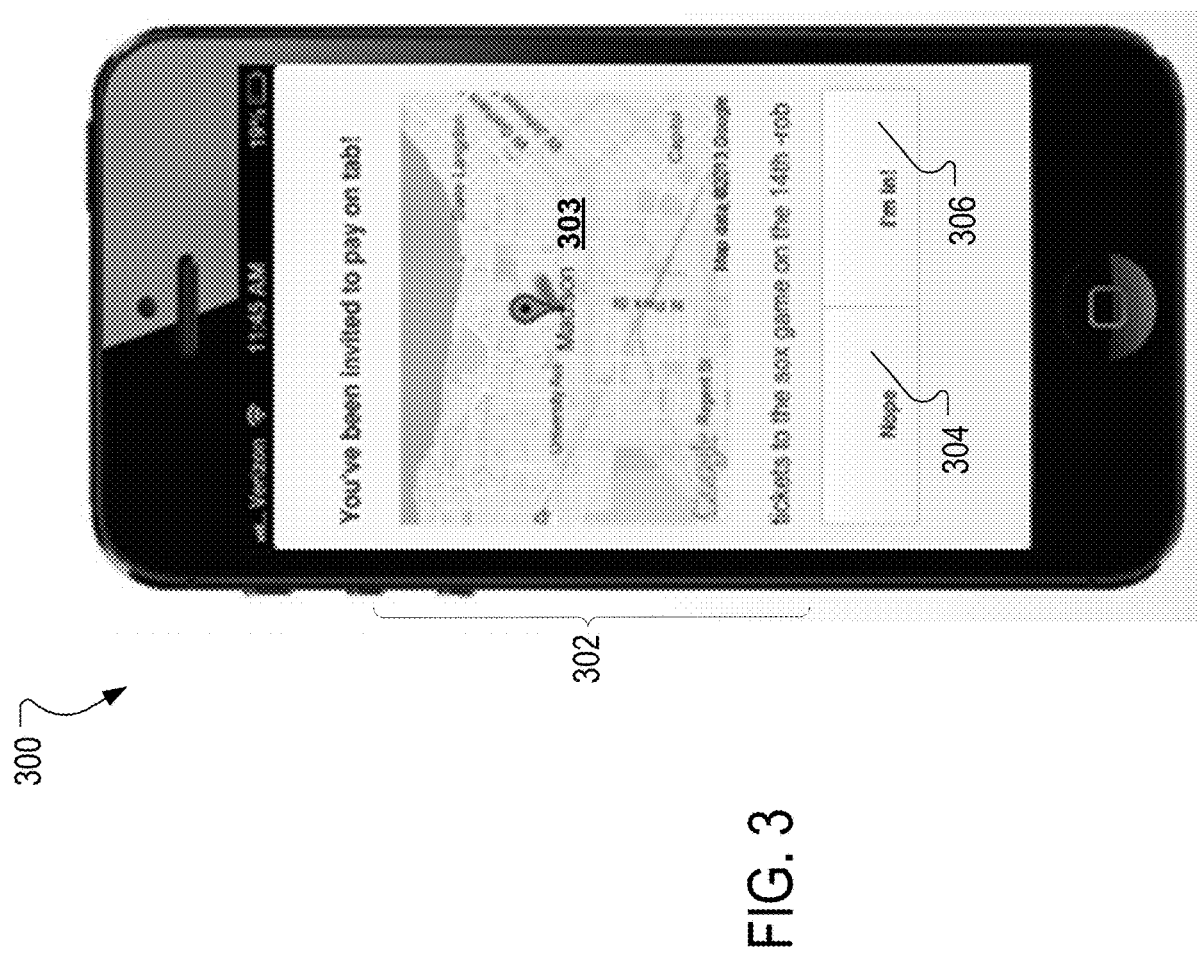

Referring to FIG. 3, graphical user interface 300 invites a user to participate in a tab (e.g., invites one or more of users 104, 106 to participate in tab 110). Graphical user interface 300 includes portion 302 that specifies the type of tab the user is invited to participate in, e.g., an invitation to participate in crowd spending for purchasing tickets to a baseball game. Portion 302 includes the invitation to participate in the tab and a map 303 of the physical location at which the transaction takes place. Graphical user interface 300 includes reject control 304, selection of which sends to the system information specifying that the user (who is invited to participate in the tab) does not want to participate in the tab and is rejecting the invitation. Graphical user interface 300 also include accept control 306, selection of which sends to the system information specifying that the user wants to participate in the tab. Through selection of accept control 306, the user is choosing to participate in the tab for the particular transaction (e.g., the baseball tickets) and is giving the system permission to charge (or otherwise debit an account of the user) for the user's portion of the transaction. As described in further detail below, an amount of the total charge is evenly allocated among the users who chose to participate in the tab for the transaction. In this example, the system automatically and evenly allocates charges for the transaction amongst the users. In another example, users may specify how much (and/or what percentage of the total charge) each user wants to be charged for his/her portion of the transaction.

Figure 4:
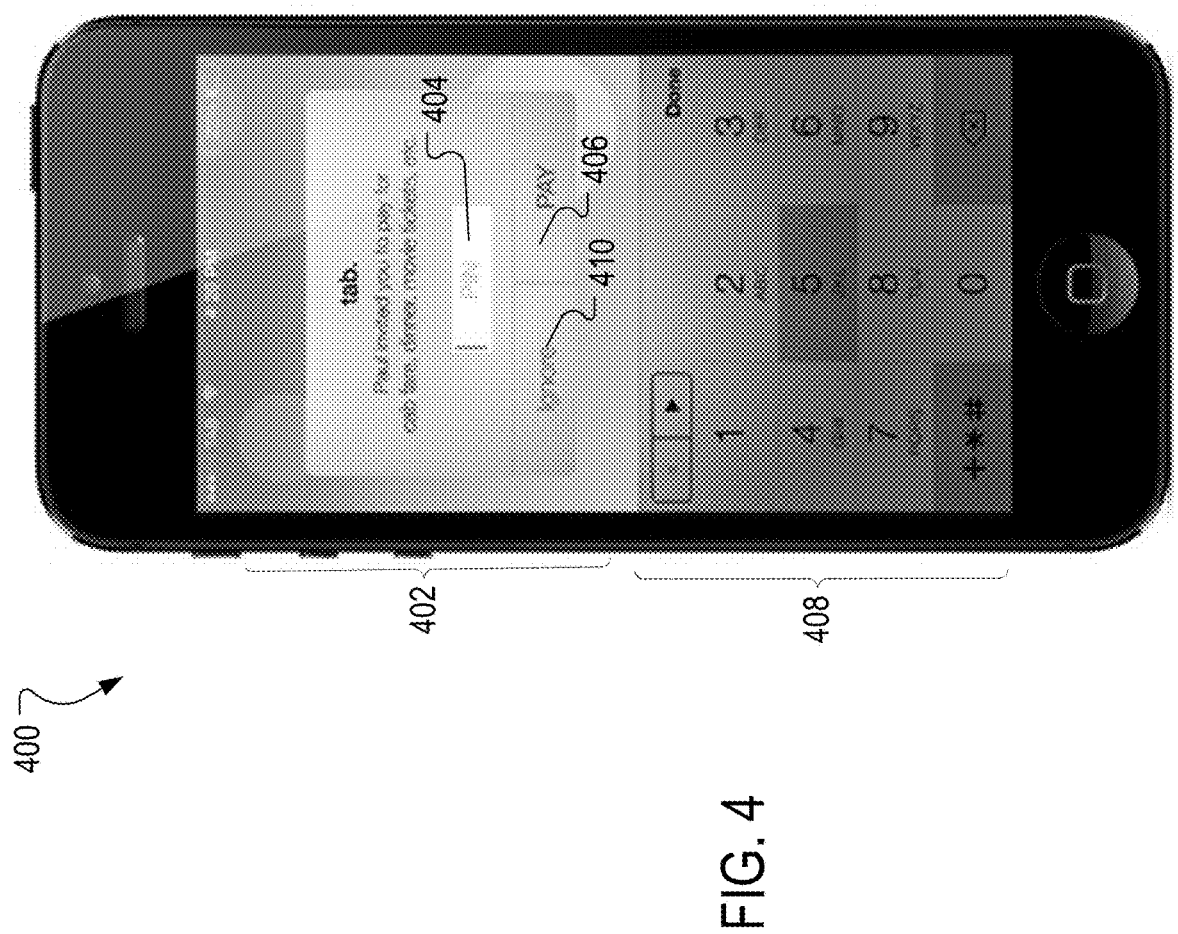

In still another example, an invitation to participate in a tab may include one or more verification controls (e.g., security controls). Generally, a verification control includes an operation or a mechanism that confirms an identity of a user. Referring to FIG. 4, graphical user interface 400 includes invitation 402 to join a tab. Invitation 402 includes verification control 404, e.g., for a user to input a PIN that is used by the system to verify an identity of a user who is accepting an invitation to join a tab. There are various types of PINs that may be used to verify an identity. In an example, a user has an account on the system. In this example, the user's account may be associated with a PIN (e.g., an account PIN). In this example, upon viewing invitation 402, the user uses keypad 408 to input the account PIN into verification control 404 and selects pay control 406. Upon selection of pay control 406, the account PIN entered into verification control 404 is transmitted to the system. Upon receipt of the transmitted account PIN, the system verifies that the transmitted account PIN corresponds (e.g., matches) to an account PIN associated with the user account of the user who is invited to participate in the tab via invitation 402. If the system determines a match, then the user is allowed to participate in the tab. If the system is unable to determine a match, the system notifies the user that the user in unable to participate in the tab, e.g., due to the system being unable to verify an identity of the user. Graphical user interface 400 also includes decline control 410, selection of which specifies that the user in declining invitation 402 to participate in the tab.

Figure 5:
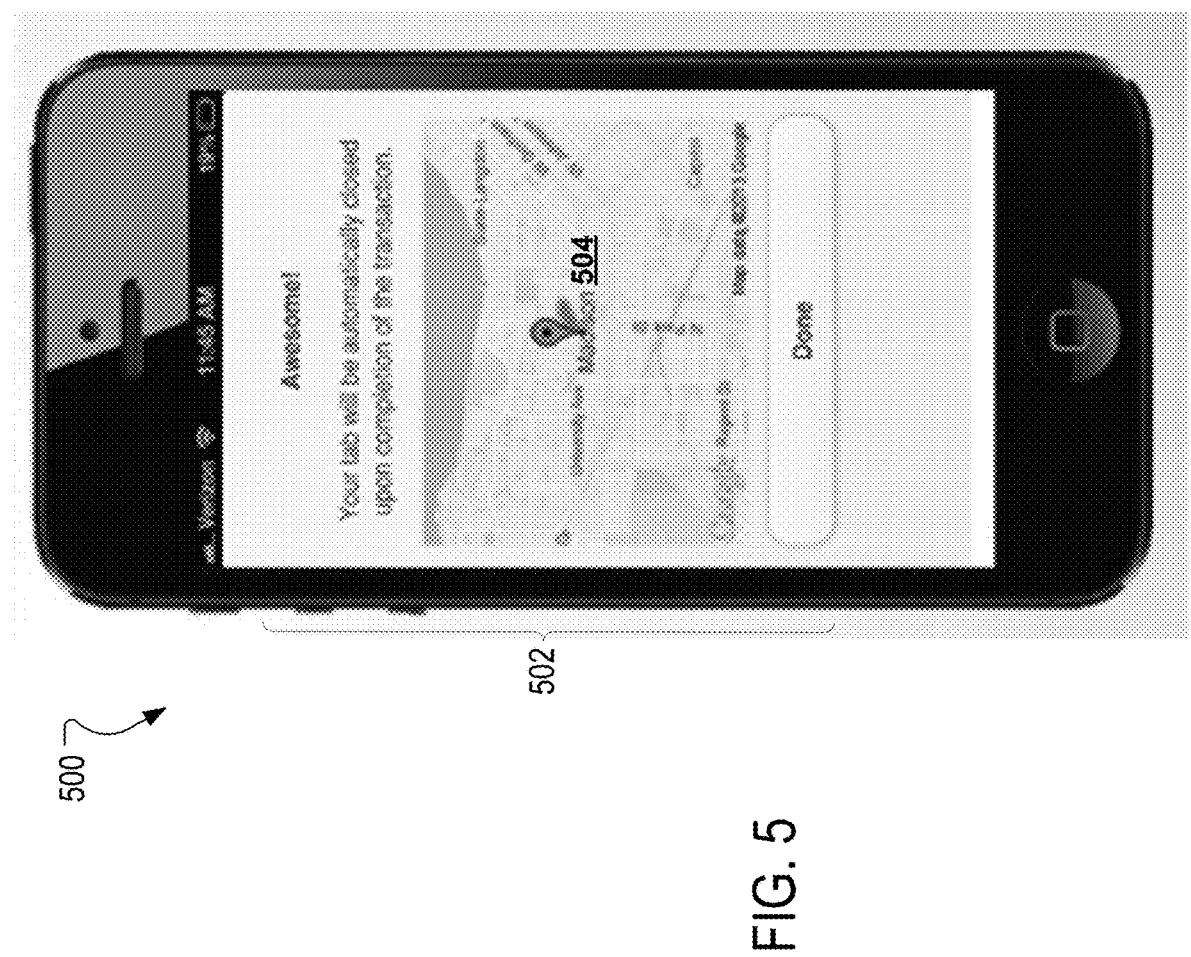

In an example, after a user swipes a payment card, the tab is activated, e.g., to promote processing of the payment for transaction. Referring to FIG. 5, graphical user interface 500 is displayed (e.g., on a client device associated with a user), following charging of the transaction on a payment card. In this example, graphical user interface 500 includes confirmation message 502 that notifies a user 102 that the tab is opened and will be closed after a total transaction amount is charged to a payment card. Confirmation message 502 includes map 504 that provides a visual indication of a geographic location in which the transaction took place.

Figure 6:
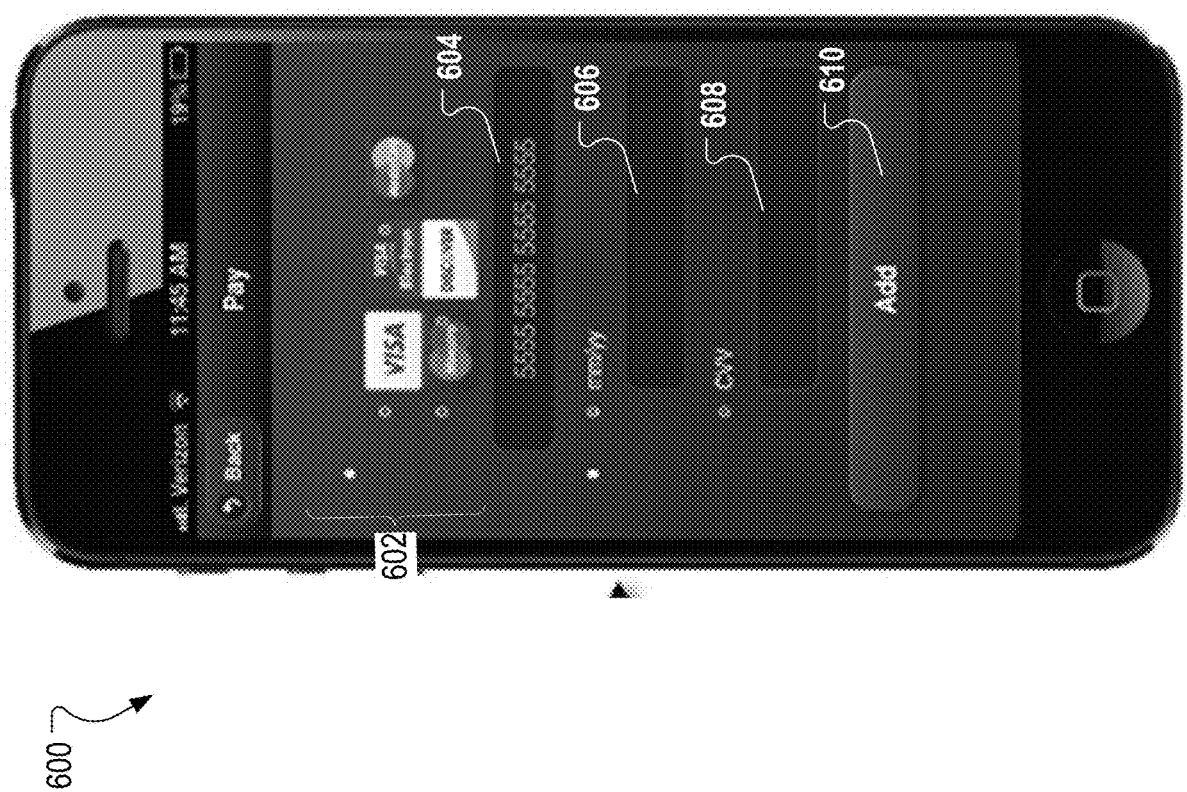

As previously described, system 120 is configured to allocate portions of a transaction amount to accounts and/or payment cards of various users. In an example, a user associates a payment card with the user's account on the system, e.g., to promote charging of the allocation amount to the payment card. Referring to FIG. 6, graphical user interface 600 promotes adding of a payment card to a user's account. Graphical user interface 600 includes portion 602 to display for a user a type of payment card that is added to the user's account, e.g., based on information input into portion 604. There are various types of payment cards, including, e.g., a Visa card, a MasterCard Card, and a Discover card. Graphical user interface 600 includes portion 604 for input of information indicative of a card number of the payment card. Graphical user interface 600 also includes portion 606 for input of expiration date information for the payment card. Graphical user interface 600 also includes portion 608 for input of information indicative of a card verification value (CVV) for the payment card. Graphical user interface 600 includes control 610, selection of which causes the information input into portions 602, 604, 606, 608 to be saved in a data repository and associated with the user's account in the system.

Figure 7:
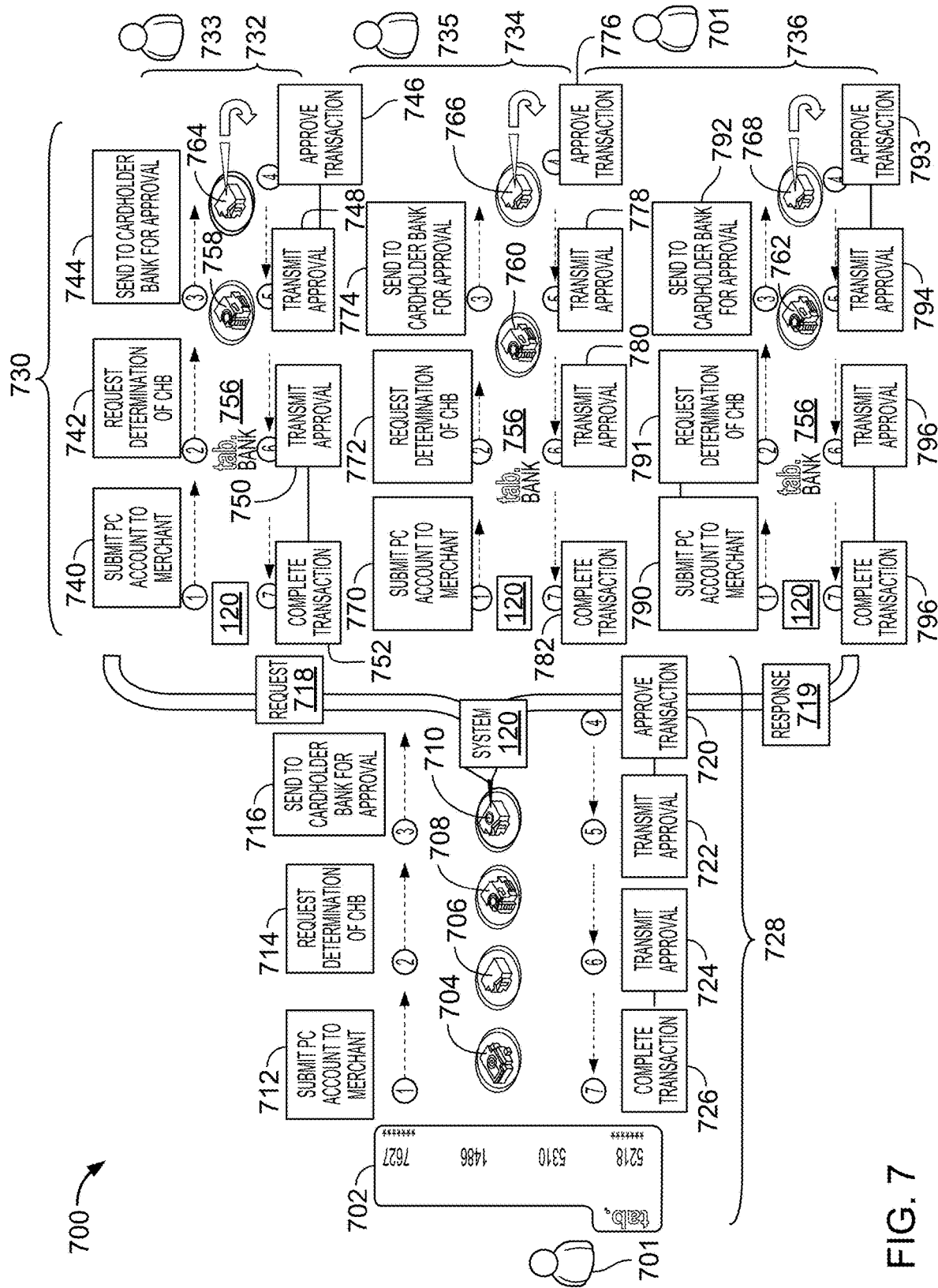
FIG. 7 is an example of a conceptual environment for determining funding sources for a transaction.

FIG. 7 shows conceptual environment 700 for determining funding sources for a transaction. In this example, an amount of a transaction is allocated (e.g., evenly and automatically) among users 701, 733, 735. In this example, conceptual environment includes authentication process 728 and funding source process 730, e.g., each of which occur simultaneously together and/or nearly simultaneously together.

In this example, user 701 is issued a payment card 702 and has an account on system 120, e.g., for generating tabs. Payment card 702 is associated with user 701 in system 120. In this example, user 701 submits (712) account information for payment card (PC) 702 to merchant 704, e.g., by allowing the merchant to charge payment card 702. Via a network (e.g., a credit card network), merchant 704 transmits the account information to the merchant's bank 706 (e.g., an acquiring bank). In response, the merchant's bank 706 requests (714) a determination of the cardholder's bank ("CHB"). In this example, the cardholder is an owner of payment card 702 and is user 701. The request is transmitted to the card network 708, e.g., an intermediary between an acquirer and an issuer to authorize credit card transactions. Generally, an acquiring bank (or acquirer) is the bank or financial institution that processes credit and or debit card payments for products or services for a merchant. The acquiring bank card network 708 validates the security features of payment card 702 and sends the account information to the cardholder's bank 710 for purchase approval.

In an example, the cardholder's bank 710 detects that payment card 702 (associated with the account information) is a funding source payment card, e.g., a payment card that is associated with system 120 and is used for funding a transaction with multi-user funding sources. For example, the cardholder's bank 710 may be associated with a system that holds information indicative of account information for various payment cards. The system may also store associations among the various account information and information specifying whether a payment card is issued by system 120 and/or otherwise associated with system 120.

In response to detecting that payment card 702 is a funding source payment card, the cardholder's bank 710 (and/or a system associated with the cardholder's bank 710) transmits request 718 to system 120. In an example, the request 718 includes a web hook request and includes information that identifies payment card 702 (e.g., a payment card number) and also includes information that specifies an amount of the transaction to be funded with multi-user funding sources. Upon receipt of request 718, system 120 implements process 730, e.g., to determine funding sources for the transaction.

Using the information that identifies payment card 702, system 120 identifies (e.g., in a data repository) that payment card 702 is associated with user 701 and also identifies a tab that is opened by user 701. System 120 identifies that users 701, 733, 735 have agreed to participate in the identified tab. System 120 evenly allocates the transaction amount among users 701, 733, 735 through execution of process 730. In particular, process 730 includes subprocess 732 for processing an allocation amount for user 733. Process 730 also includes subprocess 734 for processing an allocation amount for user 735. Process 730 also includes subprocess 736 for processing an allocation amount for user 701. In this example, system 120 executes each of subprocesses 732, 734, 736 at a substantially simultaneous time (and/or at a simultaneous time). Each of subprocesses 732, 734, 736 causes a processing of a charge in accordance with the allocation amounts for users 733, 735, 701, respectively. System 120 causes the processing of the charge for the allocation amount by simulating a transaction in which system 120 is a merchant to be paid the allocation amount. For example, for user 733, system 120 causes the allocation amount to be charged to user 733 by initiating a new transaction in which the payment card for user 733 is charged the allocation amount.

For subprocess 732, system 120 identifies a payment card, payment method or payment account for user 733. For example, system 120 identifies a credit card that user 733 has specified should be used for charging the allocation amount. System 120 acts as a merchant and performs (740) a simulation of user 733 submitting information indicative of a payment card account to the merchant, which in this example is system 120. In this example, bank 756 is associated with system 120 and acts as the merchant bank. Merchant bank 756 requests (742) a determination of the cardholder's bank, which in this example is the bank that issued the payment card that user 733 is using to charge the allocation amount. The request is sent to the card network 758 for the payment card that user 733 is using to charge the allocation amount. The card network 758 validates the security features of the payment card that user 733 is using to charge the allocation amount and sends (744) a request for purchase approval (e.g., of the allocation amount) to cardholder bank 764 for the payment card that user 733 is using to charge the allocation amount. In response, cardholder bank 764 approves (746) the purchase and transmits information indicative of the approval to card network 758. In response, card network 758 transmits (748) the approval to merchant bank 756. Merchant bank 756 transmits (750) the approval back to system 120, which completes (752) the transaction and completes subprocess 732. Upon completion of subprocess, the allocation amount that is allocated to user 733 is charged to the payment card specified by user 733 for use in the tab.

For subprocess 734, system 120 identifies a payment card, payment method or payment account for user 735. For example, system 120 identifies a credit card that user 735 has specified should be used for charging the allocation amount. System 120 acts as a merchant and performs (770) a simulation of user 735 submitting information indicative of a payment card account to the merchant, which in this example is system 120. Merchant bank 756 requests (772) a determination of the cardholder's bank, which in this example is the bank that issued payment card that user 735 is using to charge the allocation amount. The request is sent to the card network 760 for the payment card that user 735 is using to charge the allocation amount. The card network 760 validates the security features of the payment card that user 735 is using to charge the allocation amount and sends (774) a request for purchase approval (e.g., of the allocation amount) to cardholder bank 766 for the payment card that user 735 is using to charge the allocation amount. In response, cardholder bank 766 approves (776) the purchase and transmits information indicative of the approval to card network 760. In response, card network 760 transmits (778) the approval to merchant bank 756. Merchant bank 756 transmits (780) the approval back to system 120, which completes (782) the transaction and completes subprocess 734. Upon completion of subprocess, the allocation amount that is allocated to user 735 is charged to the payment card specified by user 735 for use in the tab.

For subprocess 736, system 120 identifies a payment card, payment method or payment account for user 701. For example, system 120 identifies a credit card that user 701 has specified should be used for charging the allocation amount. System 120 acts as a merchant and performs (790) a simulation of user 701 submitting information indicative of a payment card account to the merchant, which in this example is system 120. Merchant bank 756 requests (791) a determination of the cardholder's bank, which in this example is the bank that issued the payment card that user 701 is using to charge the allocation amount. The request is sent to the card network 762 for the payment card that user 701 is using to charge the allocation amount. The card network 762 validates the security features of the payment card that user 701 is using to charge the allocation amount and sends (792) a request for purchase approval (e.g., of the allocation amount) to cardholder bank 768 for the payment card that user 701 is using to charge the allocation amount. In response, cardholder bank 768 approves (793) the purchase and transmits information indicative of the approval to card network 762. In response, card network 762 transmits (794) the approval to merchant bank 756. Merchant bank 756 transmits (795) the approval back to system 120, which completes (796) the transaction and completes subprocess 736. Upon completion of subprocess, the allocation amount that is allocated to user 701 is charged to the payment card specified by user 701 for use in the tab.

In the example of FIG. 7, following completion of each of subprocesses 732, 734, 736, system 120 generates response 719, which includes information indicative of approval for the total transaction amount to be charged to payment card 702. System 120 sends response 719 to cardholder's bank 710. Based on contents of response 719, cardholder's bank 710 (and/or a system associated therewith) approves (720) the transaction and processes payment for the total amount of the transaction. In an example, cardholder's bank 710 matches the card number of payment card 702 that is included in response 719 to a payment card associated with a pending transaction in a database associated with cardholder's bank. Following identification of the appropriate pending transaction, cardholder's bank 710 (and/or a system associated therewith) transmits to the card network 708 (and/or a system associated therewith) information indicative of the approval of the identified transaction. Card network 708 (and/or a system associated therewith) processes the transaction amount and transmits (722) to the merchant's bank 706 (and/or a system associated therewith) information indicative of the approval. The merchant's bank 706 (and/or a system associated therewith) transmits (724) to the merchant 704 (and/or a system associated therewith) information indicative of the approval. The cardholder (e.g., user 701) completes (726) the transaction and receives a receipt. In a variation of FIG. 7, response 119 may include information specifying that the transaction is denied, at which point the transaction initiated by payment card 702 is not allowed to proceed.

System 120 implements various techniques in performing process 730 and in authorizing a transaction, e.g., by generating response 719 that authorizes a transaction. These techniques include a batch card-to-card load technique, a batch card-to-card transfer technique, a pass through technique, an activation/deactivation technique and a delayed allocation/re-allocation technique. In an example, system 120 implements the batch card-to-card load technique by accessing information indicative of payment cards associated with users 701, 733, 735. In this example, system 120 accesses this information by accessing user accounts for the respective users and identifying payment card information in the user accounts. System 120 then charges each of the payment cards with the respective allocation amounts for users 701, 733, 735, e.g., via subprocesses 736, 732, 734, respectively. System 120 responds to cardholder's bank 710 with a Boolean value that indicates approval for processing of the transaction by a processing network and batches the payments together.

In this example, the processing network includes a series of entities (and associated devices) that process a payment. The entities include an issuer (e.g., an issuing bank) and an acquirer (e.g., an acquiring bank). An issuing bank is a bank that offers card association branded payment cards directly to consumers.

In an example of batch card-to-card transfer, system 120 responds to the cardholder's bank 710 with card numbers (e.g., for users 701, 733, 735) and respective allocation amounts. Using the individual card numbers, the processing network loads an amount of funds that equals the total transaction amount onto payment card 702. System 120 then passes, to the cardholder's bank, authorization to charge the full amount of the transaction onto payment card 702. Each of the payment cards of users 733, 735 is also charged the respective allocation amounts (e.g., via system 120 or via the processing network). Because payment card 702 is associated with user 701 and user 701 is using payment card to pay for the entire transaction, user 701 is not charged an allocation amount. Rather, the allocation amounts that are charged to users 733, 735 are used to reimburse user 701 a portion of the total charge that is processed against payment card 702. In this example, the processing network includes the issuing bank (e.g., the cardholder's bank) and the acquiring bank.

In an example of the pass through technique, system 120 responds to the cardholder's bank 710 with card numbers (e.g., for users 701, 733, 735) and respective allocation amounts. System 120 inserts the individual card numbers back into the processing network by transmitting, to the processing network, card numbers for the payment cards and respective allocation amounts for the payment cards for processing by the processing network. The processing network then sends each individual card's data to the respective issuer of the card for processing.

In an activation/deactivation technique, the card account number associated with payment card 702 is inactive unless authorized. In this example, system 120 batch charges the payment cards of users 733, 735, e.g., by charging each of the payment cards with the respective allocation amounts. System 120 approves each of the separate transactions that are associated with the batch charging. System 120 responds to the cardholder's bank 710 with a Boolean value (e.g., a true value or a false value) that activates payment card 702 until the transaction (that is initiated by user 701) is complete.

In a delayed allocation/re-allocation technique, system 120 responds to the cardholder's bank 710 with card numbers (e.g., for users 701, 733, 735) and respective allocation amounts. The transaction initiated by payment card 702 is re-allocated as a split purchase among multiple payment cards, e.g., for users 701, 733, 735. For example, system 120 may initially allocate the total transaction amount evenly among users 701, 733, 735. One or more of users 701, 733, 735 may specify that he/she is only agreeing to pay a different amount (e.g., a re-allocation amount) and request a re-allocation. Following the re-allocation, the processing networking sends approval to respective issuing banks for approval.

Figure 8:
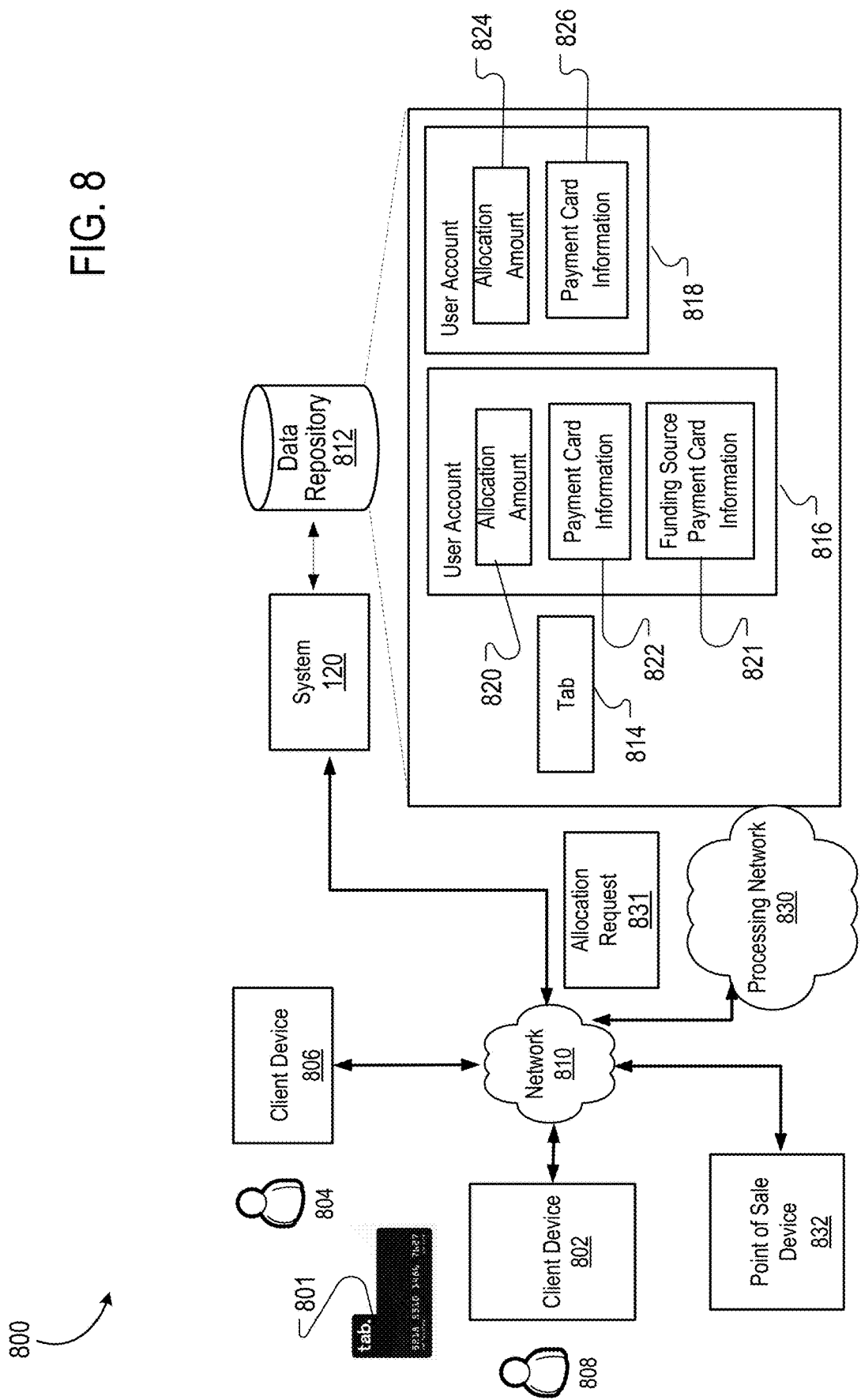
FIG. 8 is a block diagram of a system for determining multi-user funding sources.

Referring to FIG. 8, network environment 800 includes client devices 802, 806, system 120, network 810, point of sale device 832, processing network 830 and data repository 812. In this example, client device 802 is associated with user 808 and client device 806 is associated with user 804. In this example, system 120 generates data for graphical user interfaces, including, e.g., one or more of graphical user interfaces 150, 200, 300, 400, 500, 600 (FIGS. 1B-6, respectively). Using network 810, system 120 transmits the data for the graphical user interfaces to one or more of client devices 802, 806. Using the transmitted data, a client device renders a graphical user interface, including, e.g., one or more of graphical user interfaces 150, 200, 300, 400, 500, 600 (FIGS. 1B-6, respectively). Through network 810, system 120 receives data from one or more of client devices 802, 806, including, e.g., instructions to open a tab, instruction to invite users to join a tab, instructions to accept a tab invitation, and so forth.

In the example of FIG. 8, system 120 generates user account 816 for user 808. Using client device 802 and network 810, user 808 specifies payment card information 822 (e.g., a credit card number) to be associated with user account 816. System 120 updates user account 816 with payment card information 822. In this example, user 808 also owns a funding source payment card 801. In this example, user 808 requested the funding source payment card 801 through system 120 and system 120 facilitated issuance of funding source payment card 801. In this example, user 808 also associates funding source payment card 801 with user account 816, e.g., by transmitting to system 120 funding source payment card information 821 for funding source payment card 801 and information that uniquely identifies user account 816 (e.g., a user name). Upon receipt of funding source payment card information 821 and the information that uniquely identifies user account 816, system 120 updates user account 816 with funding source payment card information 821. In this example, user account 816 includes funding source payment card information 821 and payment card information 822. In this example, payment card information 822 (and/or funding source payment card information 821) may be used to charge (or credit) user 808 an allocated amount for a transaction.

Funding source payment card information 821 may be used to charge user 808 for an entire transaction, e.g., when user 808 uses funding source payment card 801 to pay for a transaction. In this example, user 808 may be reimbursed by the other users, e.g., by crediting the payment card specified by payment card information 822 with the amounts that are allocated to and paid by the other users.

System 120 generates user account 818 for user 804. Using client device 806 and network 810, user 804 specifies payment card information 826 (e.g., a credit card number) to be associated with user account 818. System 120 updates user account 818 with payment card information 826. Information indicative of user accounts 816, 818 is stored, by system 120, in data repository 812.

In this example, point of sale device 832 includes hardware and/or software at a point of sale. Generally, a point of sale is the place where a retail transaction is completed. It is the point at which a customer makes a payment to the merchant in exchange for goods or services. At the point of sale the retailer would calculate the amount owed by the customer and provide options for the customer to make payment. The merchant will also normally issue a receipt for the transaction.

In this example, users 804, 808 are at the point of sale associated with point of sale device 832. For example, a geographic location for the point of sale is a restaurant and users 804, 808 are sharing a meal. In this example, user 808 sends a request (not shown) to system 120 to open a tab. The request includes identifying information for user account 816, including, e.g., a user name of user 808 that is associated with user account 816. In response, system 120 opens tab 814 and associates tab 814 with user 816. Using client device 802 and network 810, user 808 sends to system 120 a request to invite user 804 to join tab 814. The invitation request includes a user name of user 804 that is associated with user account 818. In response, system 120 sends to client device 806 an invitation to join tab 814. User 804 accepts the invitation and system 120 adds user 804 to tab 814 by associating user account 818 to tab 814.

In this example, user 808 uses funding source payment card 801 to pay for a transaction at the point of sale. In this example, a merchant at the point of sale charges the funding source payment card 801, which causes the processing network 830 to process payment for the transaction, e.g., using one or more of the processes depicted in FIG. 7. During processing of the payment by processing network 830, processing network 830 detects a funding source payment card is used to pay for the transaction. For example, the issuing bank (included in the processing network 830) of the funding source payment card 801 may be configured to store a list of card numbers that are associated with funding source payment cards. When the issuing bank receives the request to approve the transaction, the issuing bank compares a card number included in the request to the stored list. In response to detecting that a funding source payment card 801 is used to pay for the transaction, the issuing bank sends an allocation request 831 to system 120. The sent allocation request 831 includes the card number (funding source payment card information 821) of the funding source payment card 801 and the total amount of the transaction.

Following receipt of allocation request 831, system 120 determines a match between the funding source payment card information included in allocation request 831 and funding source payment card information 821 included in user account 816. Based on the determined match and the association between tab 814 and user account 816, system 120 determines that tab 814 is used to determine the multi-user funding sources for the transaction. Using the associations between tab 814 and each of user accounts 816, 818, system 120 determines that users 804, 808 are participating in tab 814. System 120 automatically allocates (e.g., evenly) the entire amount of the transaction among users 804, 808, e.g., by determining allocation amounts 820, 824. In this example, system 120 automatically and evenly allocates the total amount of the transaction among users 804, 808 independent of input from users 804, 808. Rather, user 808 only has to give a merchant access to charge funding source payment card 801 to initiate the process of automatically and dynamically determining multi-user funding sources for the transaction. System 120 associates allocation amounts 820, 824 with user accounts 816, 818, respectively.

In the example of FIG. 8, system 120 causes a processing of one or more allocation amounts 820, 824 using one or more of the above-described techniques (e.g., a batch card-to-card load technique, a batch card-to-card transfer technique, a pass through technique, an activation/deactivation technique and a delayed allocation/re-allocation technique).

In an example of batch card-to-card transfer, system 120 approves the transaction and send to processing network 830 information indicative of the approval, e.g., to enable processing network 830 to process payment. The entire amount of the transaction is charged to funding source payment card 801, following the approval by system 120. In this example, because user 808 is initially charged for the entire amount of the transaction via processing of the total payment amount on funding source payment card 801, user 804 reimburses user 808 for a portion of the total charge that is attributable to user 804, e.g., allocation amount 824. In this example, system 120 handles processing of allocation amount 824, e.g., by initiating a new transaction for allocation amount 824, causing the payment card associated with payment card information 826 to be charged the allocation amount 824 and causing user account 816 (and/or a payment card associated with payment card information 822) to be credited allocation amount 824.

In an example of batch card-to-card load, system 120 approves the transaction and sends to processing network 830 information indicative of the approval, e.g., to enable processing network 830 to approve payment. Rather than the entire amount of the transaction being charged to funding source payment card 801, following the approval by system 120, each of users 808, 804 are charged allocation amounts 820, 824, respectively. System 120 approves the transaction of charging the payment card associated with payment card information 822 allocation amount 820. System 120 also causes processing of charging the payment card associated with payment card information 822 allocation amount 820. System 120 also approves the transaction of charging the payment card associated with payment card information 826 allocation amount 824. System 120 also causes processing of charging the payment card associated with payment card information 826 allocation amount 824.

In a variation of FIG. 8, point of sale device 832 is associated with a point of sale printer (not shown), e.g., a printer for printing out receipts at the point of sale. In this example, an interception device is placed between point of sale device 832 and the point of sale printer. In an example, the point of sale device 832 sends out serial data (via a Universal Serial Bus (USB) port or a serial cable). The interception device is installed between point of sale device 832 and the printer, intercepts specified data that enables to select individual charges, and sends the intercepted data to users via a wireless connection and/or low frequency blue tooth. That is, the interception device uses wireless technology to intercept wireless point of sale to printer communications. The interception device runs off DC power, a low frequency charge from the USB and/or serial cable. Data sent to users from the interception device enables guests at restaurants, bars and supermarkets to review an itemized digital receipt of their purchases.

The interception device enables a merchant to install a piece of hardware that pushes an itemized receipt to users of an open tab. In an example, a group opens a tab for a dinner meal. Each member of the group orders his/her food. A waitress keys the order into the point of sale device 832. The group eats and requests a check. A cardholder in the group gives his/her funding source payment card to the waitress to swipe. After swiping, the interception device recognizes the first name, last name and the last four digits on the funding source payment card. The interception device matches funding source payment card information to funding source payment card information associated with a tab and transmits a digital receipt to the participants in the group purchase who are associated with the tab. Each of the members of the group gets a push notification of the receipt on his/her mobile phone. Each member selects indicates what he/she ordered via touch to the screen or other means and then clicks okay. The users can view (e.g., in their respective mobile devices) the items being selected together and in-real time. Once everyone submits, the cardholder signs the check. Everyone in the group paid collectively for his/her meal and system 120 batches the payments to send to the merchant and the acquirer.

Figure 9:
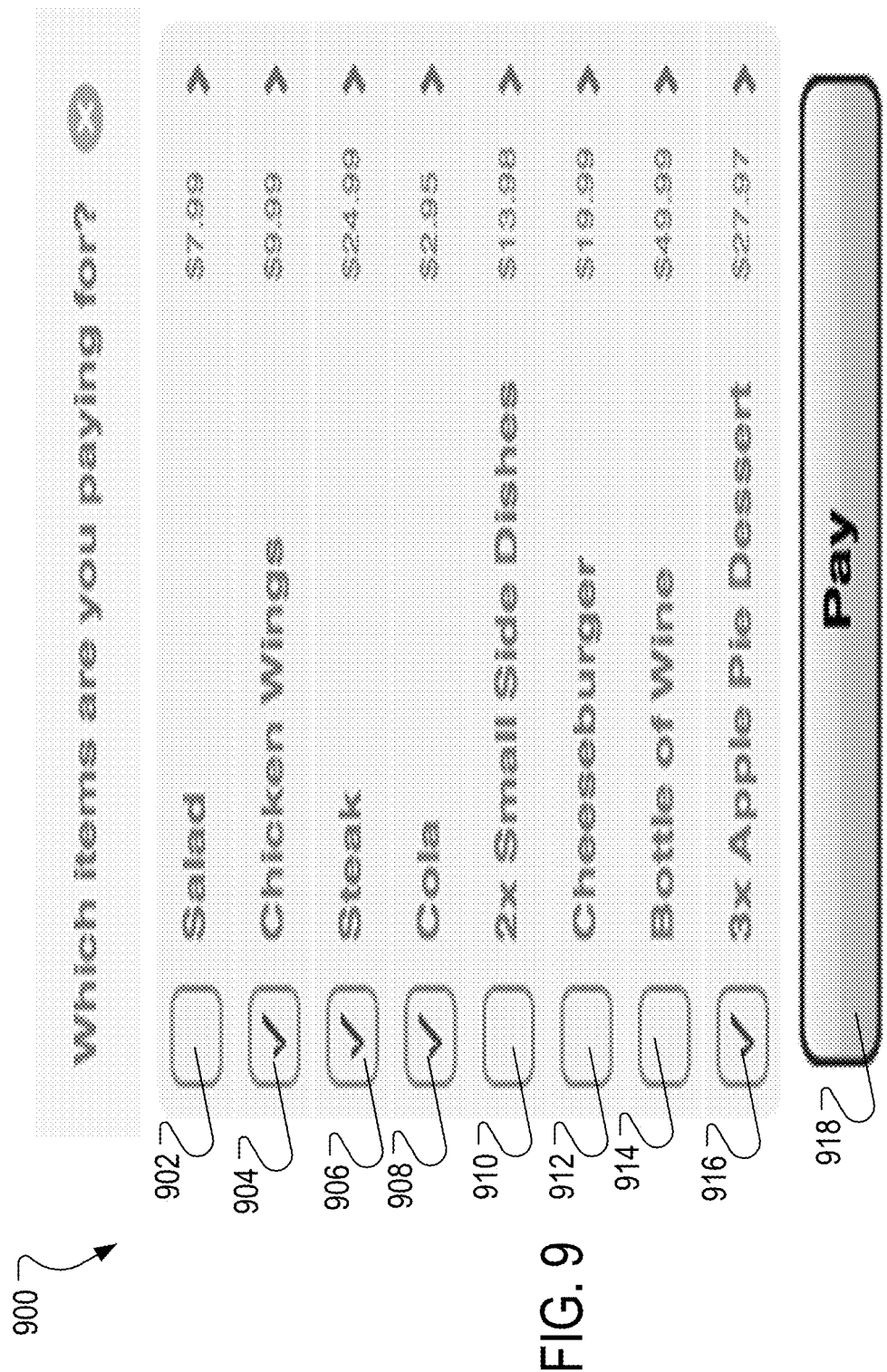

For example, referring to FIG. 9, graphical user interface 900 displays a visual representation of a receipt for a transaction, with various line items for the individual purchases that are included in the transaction. Graphical user interface 900 includes controls 902, 904, 906, 908, 910, 912, 914, 916, each of which is associated with a particular item that is included in the transaction. A user may select one or more of controls 902, 904, 906, 908, 910, 912, 914, 916. Through selection of one or more of controls 902, 904, 906, 908, 910, 912, 914, 916, a user may specify which items the user individually consumed or is otherwise responsible for the inclusion in the transaction. Graphical user interface 900 includes control 918, selection of which causes information specifying which of controls 902, 904, 906, 908, 910, 912, 914, 916 are selected and information specifying which particular items are associated with the selected controls to be transmitted from a client device rendering graphical user interface 900 to system 120. Using the transmitted information, system 120 determines which items are attributable to a particular user and determines an amount of the total transaction that is attributable to the particular user in accordance with the selected items. In this example, the allocation amount includes an amount of the total transaction that is attributable to the particular user.

The interception device provides one or more of the following advantages. When a group eats out and has a large bill, they may put down a payment card for each person. In this example, the merchant has wait staff collect the cards, run each card, build a card booklet, print a receipt, bring it to the table, pick up the card books, punch in each tip for each card and then close the table. This takes time and also costs a great deal of money over time with swipe fees and processing fees. The interception device enables a table to pay with one card, making it more time and cost efficient for the merchant.

Referring back to FIG. 8, in another example, client device 802 may download from system 120 a funding source application, e.g., software that is dedicated to communication with system 120. After installation of the funding source application, the funding source application communicates with system 120 to enable user 808 to register with system 120, input profile information, and participate in group transactions. The profile information can include a user name, password, home address, and a link to a user's actual debit/credit card. User 808 can request a funding source payment card (e.g., funding source payment card 801). A funding source payment card can be a physical card, e.g., a debit/credit card, a reward card, or an electronic representation of a card, which may be displayed on a mobile device. The electronic representation of the card may include text and non-text, such as image data. The image data may represent a logo.

In one example, the funding source application enables the electronic representation of the card to transfer data to the point of sale device 832 using Near Field Communication (NFC) technology, enabling the funding source payment cardholder to make simpler transactions, exchange digital content, and connect electronic devices, such as the point of sale device 832, with a touch.

In another example, the funding source application displays a matrix barcode, such as a Quick Response Code (QR code), along with the electronic representation of the card, enabling the funding source payment cardholder to make simpler transactions, exchange digital content, and connect electronic devices, such as the POS system, with a touch. In still another example, the funding source application displays a barcode along with the electronic representation of the card, enabling the funding source payment cardholder to make simpler transactions, exchange digital content, and connect electronic devices, such as the POS system, with a touch.

In the example of FIG. 8, users 804, 808 are registered with the system 120. User 808, who is a cardholder of funding source payment card 801, invites user 804 to make a group purchase, e.g., to pay for a dinner that users 804, 808 are attending, as previously described. In this example, user 808 has payment for goods and services linked to his/her personal credit card (associated with payment card information 822) in user account 816. This card is used to fund the share of group expenses for user 808. In an example, the invitation is sent from client device 802 to system 120 via email or simple messaging service (SMS). System 120 relays the invitation to client device 806. As previously described, user 804 has loaded debit card information into a payment portal on his/her profile in the funding source application and does not have a funding source payment card.

Running the funding source application on client device 806, user 804 accepts the invitation of user 808. The acceptance is handled by system 120. Once the invitation is sent and accepted, the tab process generates tab 814, which includes a unique ID, that associates users 804, 808 with a specific purchase or transaction made or to be made by user 808.

User 808 uses the funding source payment card 801 to pay for the item and/or service. Information indicative of notification and details of this card use are sent to system 120, which divides the total numeric amount owed equally among the members of the tab, i.e., users 804, 808, and sends the amounts owed to the various credit/debit cards associated with the respective users. In one example, a user can use the funding source application to communicate with system 120 to pay a portion of the total amount due for the transaction. System 120 verifies that the amounts authorized for each user totals the amount due.

In some examples, a user has the ability to add a payment card he/she chooses to his/her funding source application (and to the respective user account). If user 808 wishes, he or she can have his/her funding source payment card 801 linked to a credit card with certain rewards, a business credit card, business debit, personal debit and/or bank account. This feature allows for one single card to be carried in the user's wallet or stored in his/her mobile device and the funding source application routes the users' decision of payment type via system 120. Funding source payment card 801 promotes having a single card in a wallet or a single electronic version of a card in a mobile phone. User 808 can open the funding source application on client device 802 and select which card he/she loaded into system 120 (and associated with user account 816) to be the source of payment. User 808 can choose between credit cards, debit cards or bank accounts to make payment. By doing so, user 808 is able to split a personal expense between two or more of his/her cards that are in a digital wallet (e.g., user account 816).

In an example, the funding source application (on client device 802) provides a security feature that allows user 808 to put his/her funding source payment card 801 in a status of active or inactive. Through a setting in the funding source application, the card can be turned "on" or in this case made active and can be used for payments. If user 808 wishes, he or she can inactivate the card or "close" the funding source payment card for periods of time between transactions. This allows for control of the card in cases of loss, theft or personal choice. The funding source payment card can be used based on the choice of the user.

In some examples, system 120 includes a reverse geocode authentication process. Generally, reverse geocoding includes a process of back (reverse) coding of a point location (latitude, longitude) to a readable address or place name. This permits the identification of nearby street addresses, places, and/or areal subdivisions such as neighborhoods, county, state, or country. In this example, the geographic locations of each of the users in an open tab, e.g., each user's geographic position as specified by longitude and latitude coordinates, are analyzed (by system 120) when a transaction is initiated. If each of the users is located in proximate geographic locations to each other (and/or geographic locations within a specified distance to each other), system 120 allows the processing of payment(s) for the transaction to continue. If one or more of the users is not located proximately to the group of users, system 120 disallows the transaction, e.g., by determining the possibility of fraud. In another example, if system 120 determines a mismatch between a geographic location of a user and geographic location of another user or of the merchant, system 120 transmits to a client device associated with the user, a message requesting authorization to charge a specified allocation amount to the user account of the user. Upon receipt of the requested authorization, system 120 approves the transaction and processing is continued.

When opening a tab, the funding source payment cardholder can select a duration of time for a tab to remain open for group transactions to be paid for on the funding source payment card. In an example of a weekend trip with multiple users, a user who opens the tab can specify that the tab remains open for three days following opening of the tab. During that time frame, group transactions would be split between the members of the tab and the tab is finally "closed" on the third day. In this example, the group transactions are allocated equally or proportionately to amounts each individual user spends (according to user selected transactions). In another example, a tab could be opened for a single group transaction, or open for a few hours or for days.

Based on communications between the point of sale device 832 and system 120, system 120 is configured such that when a tab is opened among users at a restaurant, system 120 locates geographical locations of users who join the tab ("tab members") via their mobile devices. In this example, system 120 sends requests to the funding source applications on the mobile devices for the users to send information to system 120 that specifies the geographic locations of the respective users. Using this geographic location information, system 120 determines and confirms that the users are in the same location.

When the funding source payment card or an electronic representation of the funding source payment card is used for payment, the point of sale device 832 causes a transmission (via one or more of network 810 and processing network 830) of a merchant identifier (ID) to system 120. A merchant ID is a unique number assigned to a merchant account to identify it throughout the course of processing activities. In this example, system 120 recognizes the merchant ID and matches a geographic location for the merchant ID to a geographic location of the users. For example, data repository 812 may store a listing of merchant IDs and associated geographic locations. In this example, system 120 may look-up in the listing a geographic location that is associated with the transmitted merchant ID. Based on the determined match between geographic locations, system 120 approves the transaction for processing.

In another example, following the match, the point of sale device 832 sends the itemized receipt to the users who are participating in the open tab. At that time, each user (via the funding source application on mobile devices) selects what he/she ordered during the meal. The mobile devices send, to system 120, information indicative of items that each user has selected. Based on a user's selection of items, system 120 determines a portion of the entire amount that is attributable to the user. In this example, the funding source payment card user can pay with his/her card and can be reimbursed for the other users' allocated amounts or specified portions via charges processed by system 120. In another example, the funding source payment card user and other users in the group can each pay for his/her portion directly through his/her funding source application with the merchant/vendor.

In some examples, the funding source application provides a financial dashboard highlighting the usage of the user's funding source payment card and enabling the user to review statements, see spending trends and generate custom alerts and notifications. Users can view how they spend with their friends and export these results to, for example, a spread sheet.

In another example, system 120 enables eCommerce and transactions where respective users are not physically together or without mobile service by implementing the following technique. In this example, a user, who is opening a tab, selects other users who are not in a same or close geographic location of the user who is opening the tab. In this example, system 120 implements Internet Protocol (IP) based tracking of a web purchase for matching a geographic location of a point of sale with a geographic location of a mobile device. In this example, system 120 determines a geographic location of a user who is requesting the opening of the tab, e.g., by receiving from a mobile device of the user information specifying the geographic location of the mobile device. System 120 also receives a merchant ID from point of sale device 832. Using the previous described listing in data repository 812, system 120 determines a match between a geographic location associated with the merchant ID and a geographic location of a mobile device used by a user who is requesting that the tab be open. Based on the determined match, system 120 opens a tab for the user and the remainder of the transaction processing proceeds independent of geographical location matching or verification.

Figure 10:
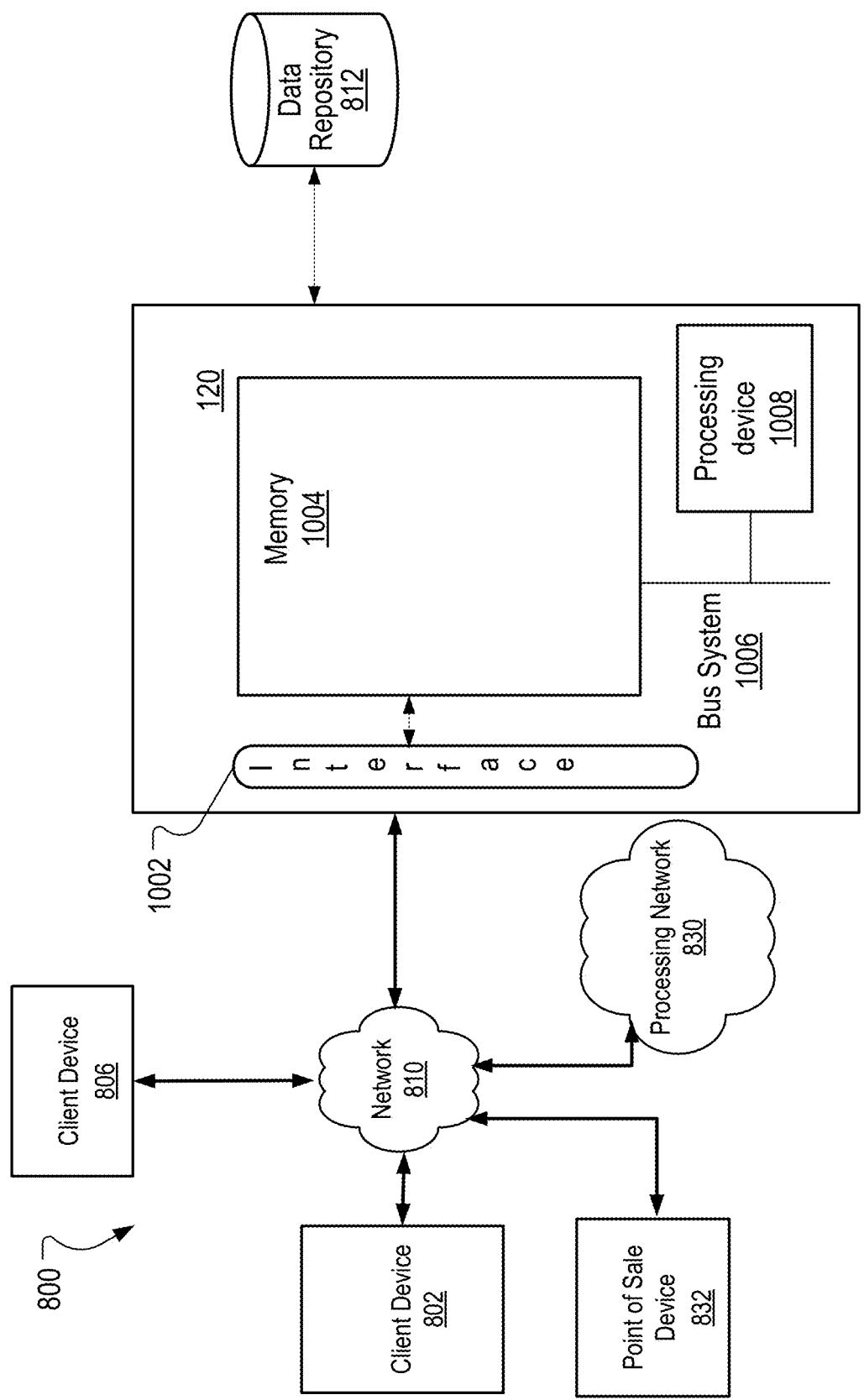
FIG. 10 is a block diagram of components of the system for determining multi-user funding sources.

Referring to FIG. 10, client devices 802, 806 can be any sort of computing devices capable of taking input from a user and communicating over network 810 with system 120 and/or with other client devices. For example, client devices 802, 806 can be mobile devices, smartphones, desktop computers, laptops, cell phones, personal digital assistants ("PDAs"), servers, embedded computing systems, and so forth.

System 120 can be any of a variety of computing devices capable of receiving data, such as a server, a distributed computing system, a desktop computer, a laptop, a cell phone, a rack-mounted server, and so forth. System 120 may be a single server or a group of servers that are at a same location or at different locations.

The illustrated system 120 can receive data from one or more client devices 802, 806 via input/output ("I/O") interface 1002 (e.g., through network 810 and/or processing network 830). I/O interface 1002 can be any type of interface capable of receiving data over a network, such as an Ethernet interface, a wireless networking interface, a fiber-optic networking interface, a modem, and so forth. System 120 also includes a processing device 1008 and memory 1004. A bus system 1006, including, for example, a data bus and a motherboard, can be used to establish and to control data communication between the components of system 120.

The illustrated processing device 1008 may include one or more microprocessors. Generally, processing device 1008 may include any appropriate processor and/or logic that is capable of receiving and storing data, and of communicating over a network (not shown). Memory 1004 can include a hard drive and a random access memory storage device, such as a dynamic random access memory, or other types of non-transitory machine-readable storage devices. Memory 1004 stores computer programs (not shown) that are executable by processing device 1008 to perform the techniques described herein.

Figure 11:
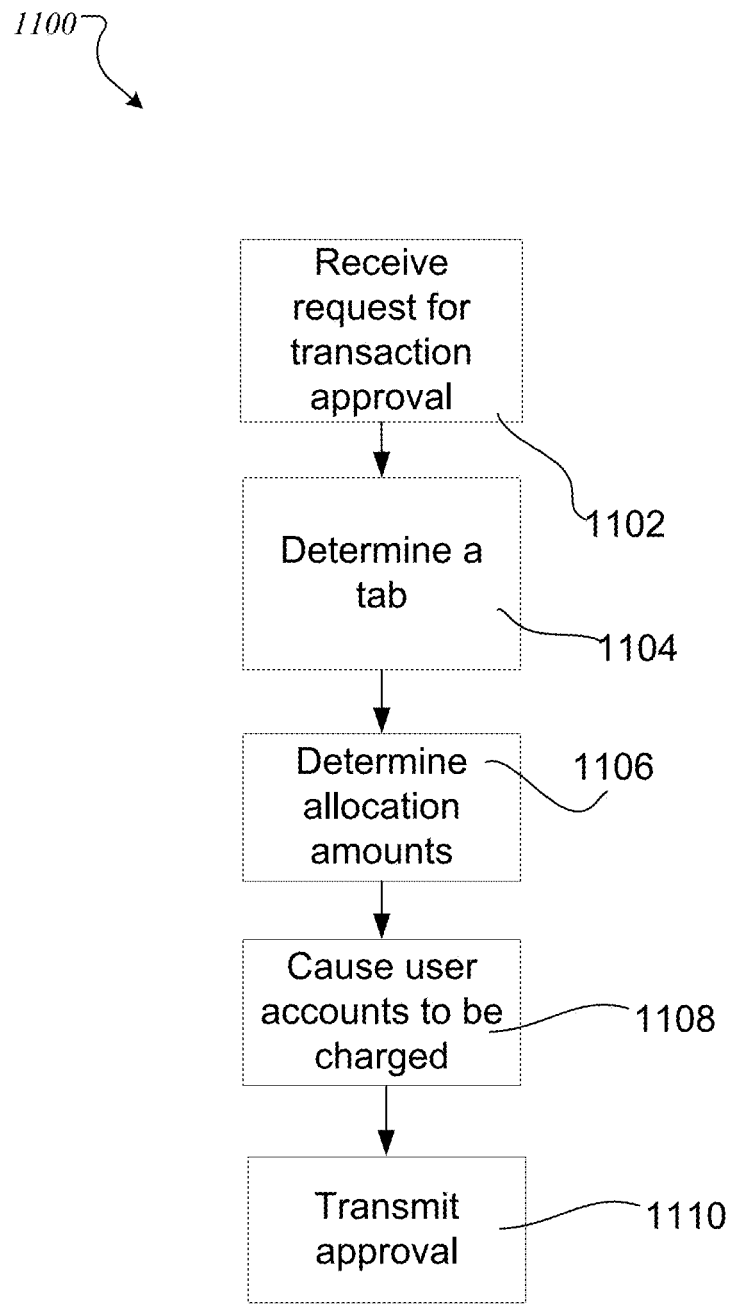
FIG. 11 is a flow chart of a process executed by the system for determining multi-user funding sources.

Referring to FIG. 11, system 120 implements process 1100 in dynamically determining multi-user funding sources. In operation, system 120 receives (1102), from a processing network, a request to approve a transaction. In this example, the request includes identifying information of a user who initiated the transaction (e.g., a card number for a funding source payment card, a user name, and so forth) and an amount of the transaction.

System 120 determines (1104) a tab that is associated with the transaction. For example, using a card number for a funding source payment card that is included in the approval request, system 120 determines a user account that is associated with the funding source payment card. System 120 identifies a tab that is associated with the determined user account. System 120 also determines (1106) allocation amounts, e.g., by evenly allocating the total amount of the transaction among the users who have joined the tab. In another example, system 120 disproportionately allocates the amount of the transaction among the users who have joined the tab, e.g., by allocating to each user a portion of the transaction that is attributable to the user. In this example, each user sends to system 120 information specifying items included in the transaction that the user has ordered or otherwise caused to be included in the transaction. In still another example, system 120 accesses, based on the identifying information of the user who initiates the transaction, (i) information specifying that the amount of the transaction is to be allocated among a first user account of the first user and one or more second user accounts of one or more second users (e.g., a tab), and (ii) information specifying an allocation amount for each of the user accounts associated with the tab.

System 120 causes (1108) each of the users who are members of the tab to be charged respective allocation amounts, e.g., using one or more a batch card-to-card load technique, a batch card-to-card transfer technique, a pass through technique, an activation/deactivation technique and a delayed allocation/re-allocation technique. System 120 also transmits (1110), to the processing network, information specifying approval for the transaction.

Using the techniques described herein, a single payment card communicates with a point of sale device or terminal and sends a receipt of the purchase to the funding source application and line items are split among a group of users, as described in U.S. Ser. No. 14/035,548, the entire contents of which are incorporated herein by reference. A payment card is linked to single or multiple user accounts and payment is split by user "opt in" and allocated evenly, e.g., while payment is processed simultaneously. Payment as a group is split among multiple users by utilizing a payment card linked to a mobile application, which processes group payment automatically and each user contributes his/her share of payment. A payment card (e.g., a funding sourcing payment card) can have multiple cards, bank accounts and third party payment platforms registered to the payment card. The system described herein enables an ability to open/close a plastic card (or an electronic representation of a funding source payment card) via a mobile application. This allows for a funding source payment card (or an electronic representation of a funding source payment card)

to be "open" and/or available for purchases and "closed" when not authorized for purchases, thus providing security to a user.

In an example, the system includes an application programming interface (API) for integrating the system and the techniques described herein with a third-party application. In an example, a user chooses to make a purchase through the third-party application. Through the API, the third-party application is configured to interface with the system. Following selection of the third-party application, the user is prompted (e.g., via the third-party application) to select other users (e.g., friends) with whom to share the expense. Through the API, the third-party application sends information indicative of the selection to the system, which in turn, sends to the selected users an invitation to accept or deny the invitation. If an invited user has the Tab application and accepts the invitation, the system automatically charges the invited user for his/her portion of the tab, e.g., using the above-described authorization process and funding routing. If the invited user does not have the Tab application (e.g., executing on a mobile device), the invited user is promoted to download either the Tab application or the third-party application.

Embodiments can be implemented in digital electronic circuitry, or in computer hardware, firmware, software, or in combinations thereof. An apparatus can be implemented in a computer program product tangibly embodied or stored in a machine-readable hardware storage device for execution by a programmable processor; and method actions can be performed by a programmable processor executing a program of instructions to perform functions by operating on input data and generating output. The embodiments described herein, and other embodiments of the invention, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media and/or hardware storage devices for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be data in different formats such as text, graphics, images, sound, video, Hypertext Markup Language (HTML), as well as programs. Upon specification of a link by the user, the client computer makes a TCP/IP request to a Web server and receives data, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view data available on servers or networks on the Web through the use of browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of exemplary embodiments of the invention have been described. Nevertheless, it will be understood by one of ordinary skill in the art that various modifications may be made without departing from the spirit and scope of the invention.

What is claimed is:

1. A data processing apparatus for processing network data records transmitted from a plurality of remote, distributed terminal devices, comprising:
   at least one processor; and
   a memory storing instructions that, when executed by the at least one processor, cause the at least one processor to perform operations including:
   receiving allocation information specifying an allocation of transaction amounts from among payment sources associated with a plurality of networked client devices;
   simulating a digital exchange process among the plurality of networked client devices for allocating the transaction amounts between a first account associated with a first client device and a second account associated with a second client device by performing operations comprising:
      performing a security authentication process for each of the first client device and the second client device of the networked client devices by:
         receiving, for each of the first client device and the second client device, a geo-code indicating a location of that client device;
         receiving identifier data indicating a terminal device that is physically associated with the digital exchange process, the terminal device being a non-mobile device associated with a location;
         determining the location of the terminal device that is physically associated with the digital exchange process based on the identifier data indicating the terminal device;
         authenticating, from the geo-code of each of the first and second client devices, that each of the first and second client devices is located within a specified distance to the location of the terminal device that is physically associated with the digital exchange process; and
         determining whether to allow the digital exchange process to continue when the authenticating indicates that each of the first and second client devices is located within the specified distance to the location of the terminal device that is physically associated with the digital exchange process;
      determining, based on determining whether to allow the digital exchange process to continue and based on the allocation information, the transaction amounts for assigning to at least a first payment source associated with the first client device and a second payment source associated with the second client device, the first payment source and the second payment sources included in the payment sources; and
      simulating the digital exchange process among the first payment source and second payment source, wherein approval by the first payment source and the second payment source for the digital exchange process are received during the simulation; and
      causing, based on the simulating and in response to receiving the approval by the first payment source and the second payment source for the digital exchange process, modification of the first account and the second account in accordance with the transaction amounts, wherein the modification of the first and second accounts occur substantially simultaneously.

2. The data processing apparatus of claim 1, wherein the terminal device is a point of sale device.

3. The data processing apparatus of claim 2, wherein simulating the digital exchange process among the plurality of networked client devices for allocating the transaction amounts is initiated with a physical machine-readable device at the point of sale device.

4. The data processing apparatus of claim 3, wherein the physical machine-readable device comprises a credit card or a debit card.

5. The data processing apparatus of claim 1, wherein the security authentication process further comprises determining that each the payment sources are activated.

6. The data processing apparatus of claim 1, wherein causing the modification of the first and second accounts occurs using a delayed allocation/re-allocation technique.

7. The data processing apparatus of claim 1, wherein causing the modification of the first and second accounts occurs using a batch transfer technique.

8. The data processing apparatus of claim 1, wherein causing the modification of the first account and the second account occurs using a pass through technique.

9. The data processing apparatus of claim 1, the operations further comprising:
   generating report data representing the modification of the first and second accounts; and
   sending the report data to an interception device configured to print the report data.

10. A method for processing network data records transmitted from a plurality of remote, distributed terminal devices, comprising:
    receiving allocation information specifying an allocation of transaction amounts from among payment sources associated with a plurality of networked client devices;
    simulating a digital exchange process among the plurality of networked client devices for allocating the transaction amounts between a first account associated with a first client device and a second account associated with a second client device by performing operations comprising:
       performing a security authentication process for each of the first client device and the second client device of the networked client devices by:
          receiving, for each of the first client device and the second client device, a geo-code indicating a location of that client device;
          receiving identifier data indicating a terminal device that is physically associated with the digital exchange process, the terminal device being a non-mobile device associated with a location;
          determining the location of the terminal device that is physically associated with the digital exchange process based on the identifier data indicating the terminal device;
          authenticating, from the geo-code of each of the first and second client devices, that each of the first and second client devices is located within a specified distance to the location of the terminal device that is physically associated with the digital exchange process; and
          determining whether to allow the digital exchange process to continue when the authenticating indicates that each of the first and second client devices is located within the specified distance to the location of the terminal device that is physically associated with the digital exchange process;

determining, based on determining whether to allow the digital exchange process to continue and based on the allocation information, the transaction amounts for assigning to at least a first payment source associated with the first client device and a second payment source associated with the second client device, the first payment source and the second payment sources included in the payment sources; and simulating the digital exchange process among the first payment source and the second payment source, wherein approval by the first payment source and the second payment source for the digital exchange process are received during the simulation; and causing, based on the simulating and in response to receiving the approval by the first payment source and the second payment source for the digital exchange process, modification of the first account and the second account in accordance with the transaction amounts, wherein the modification of the first and second accounts occur substantially simultaneously.

11. The method of claim 10, wherein the terminal device is a point of sale device.

12. The method of claim 11, wherein simulating the digital exchange process among the plurality of networked client devices for allocating the transaction amounts is initiated with a physical machine-readable device at the point of sale device.

13. The method of claim 12, wherein the physical machine-readable device comprises a credit card or a debit card.

14. The method of claim 10, wherein the security authentication process further comprises determining that each the payment sources are activated.

15. The method of claim 10, wherein causing the modification of the first and second accounts occurs using a delayed allocation/re-allocation technique.

16. The method of claim 10, wherein causing the modification of the first and second accounts occurs using a batch transfer technique.

17. The method of claim 10, wherein causing the modification of the first and second accounts occurs using a pass through technique.

18. The method of claim 10, further comprising: generating report data representing the modification of the first and second accounts; and sending the report data to an interception device configured to print the report data.

19. One or more non-transitory computer readable media storing instructions for processing network data records transmitted from a plurality of remote, distributed terminal devices, wherein the instructions, when executed by at least one processor, configured to cause the at least one processor to perform operations comprising:

receiving allocation information specifying an allocation of transaction amounts from among payment sources associated with a plurality of networked client devices;

simulating a digital exchange process among the plurality of networked client devices for allocating the transaction amounts between a first account associated with a first client device and a second account associated with a second client device by performing operations comprising:

performing a security authentication process for each of the first client device and the second client device of the networked client devices by:

receiving, for each of the first client device and the second client device, a geo-code indicating a location of that client device;

receiving identifier data indicating a terminal device that is physically associated with the digital exchange process, the terminal device being a non-mobile device associated with a location;

determining the location of the terminal device that is physically associated with the digital exchange process based on the identifier data indicating the terminal device;

authenticating, from the geo-code of each of the first and second client devices, that each of the first and second client devices is located within a specified distance to the location of the terminal device that is physically associated with the digital exchange process; and determining whether to allow the digital exchange process to continue when the authenticating indicates that each of the first and second client devices is located within the specified distance to the location of the terminal device that is physically associated with the digital exchange process;

determining, based on determining whether to allow the digital exchange process to continue and based on the allocation information, the transaction amounts for assigning to at least a first payment source associated with the first client device and a second payment source associated with the second client device, the first payment source and the second payment sources included in the payment sources; and simulating the digital exchange process among the first payment source and the second payment source, wherein approval by the first payment source and the second payment source for the digital exchange process are received during the simulation; and causing, based on the simulating and in response to receiving the approval by the first payment source and the second payment source for the digital exchange process, modification of the first account and the second account in accordance with the transaction amounts, wherein the modification of the first and second accounts occur substantially simultaneously.

20. The one or more non-transitory computer readable media of claim 19, the operations further comprising:

generating report data representing the modification of the first and second accounts; and sending the report data to an interception device configured to print the report data.

* * * * *